J. P. STEIN.
OPERATING DEVICE FOR VEHICLE LAMPS.
APPLICATION FILED MAR. 29, 1909.

941,739.

Patented Nov. 30, 1909.

John P. Stein
Inventor

Witnesses
J. O'Kelly
E. L. Jones

By E. A. Kelly,
Attorney

UNITED STATES PATENT OFFICE.

JOHN P. STEIN, OF READING, PENNSYLVANIA.

OPERATING DEVICE FOR VEHICLE-LAMPS.

941,739.

Specification of Letters Patent.

Patented Nov. 30, 1909.

Application filed March 29, 1909. Serial No. 486,349.

*To all whom it may concern:*

Be it known that I, JOHN P. STEIN, citizen of the United States, residing at Reading, in the county of Berks and State of Pennsylvania, have invented certain new and useful Improvements in Operating Devices for Vehicle-Lamps, of which the following is a specification.

This invention relates to improvements in lamp attachments for vehicles and it is intended more particularly for use on automobiles.

The object of the invention is to provide means for turning the lamps of an automobile so that they will always shed the light rays in the direction in which the front wheels are directed,—that is, an attachment that will operate in conjunction with, or at least simultaneously with the front wheels when they are moved by the steering gear.

The invention consists of a pivoted support for each lamp and a connection thereto from the steering apparatus, so devised that the operation of the steering gear will at the same time operate the lamps and turn them in the same general direction in which the wheels are directed.

The invention is more fully described in the following specification and clearly illustrated in the accompanying drawing, in which:—

Figure 1:
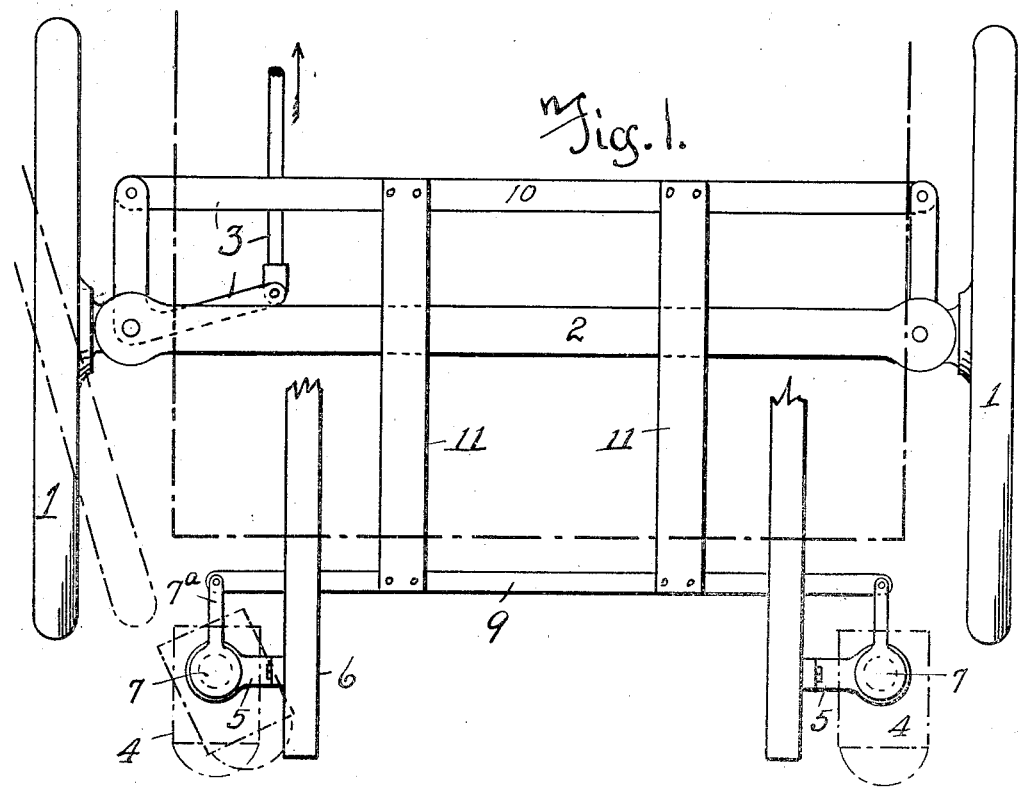
Figure 2:
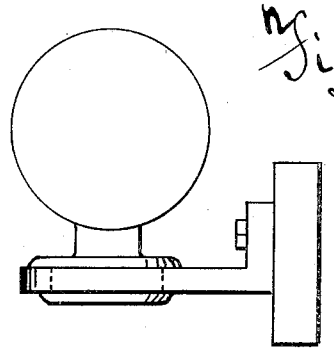

Figure 1 is a plan view of the forward end of an automobile with my invention applied thereto. Fig. 2 is a vertical section of one of the lamp holders.

The numeral 1 designates the front wheels and 2 the axle of an automobile. The numeral 3 designates the steering gear thereof. This steering gear may be of any of the well known constructions and is connected in a suitable manner to the front wheels, so that turning the hand wheel in one direction will throw the wheels to the desired angle with relation to the axis of the axle, while the reverse movement of the wheel will cause them to be thrown in the opposite direction. This is the well known action of the steering gear on vehicles of this class.

The numeral 4 designates the lamps. These lamps are mounted on brackets 5 secured to the frame 6 of the vehicle in any suitable manner. These brackets are each provided with an oscillating holder 7 on which the lamps are secured. These holders 7 are operatively connected to the steering apparatus by means of a simple construction of a rod 9 and stringers 11 and arranged to operate in conjunction with the steering apparatus. The rod 9 connects the arm 7ª of one of the lamp holders with a like lamp holder 7 on the opposite side of the vehicle, so that both lamps will turn in unison. This rod 9 is joined to the rod 10 of the steering apparatus by means of suitable stringers 11 in such a manner that the rod 10 in its movement to either side, will carry with it the rod 9.

When the steering apparatus is operated, for instance in the direction of the arrow in Fig. 1, which will throw the vehicle's wheels in the direction indicated by dotted lines, the same action, will, through the rod connection 9 and stringers 11, turn the oscillating lamp holder 7 in the same direction, and as the lamp is secured in said holder it will cause the rays of light therefrom to be shed in the general direction in which the wheels of the vehicle are directed. The operation of the steering apparatus will cause the lamps to be turned in either direction, and they will always point in the same direction in which the forward wheels of the vehicle are directed.

Having thus fully described my invention, what I claim and desire to secure by Letters Patent is:—

In an operating device for vehicle lamps, the combination of a steering apparatus comprising in its make up a transverse rod, with two rotatably mounted lamps, brackets on which said lamps are supported, oscillating holders in which said lamps are mounted, a rearwardly extending arm formed on each of said holders, a second transverse rod pivotally connected at both of its ends to the ends of the rearwardly extending holder arms, and a pair of stringers rigidly secured to said second transverse rod and to the transverse rod of the steering apparatus, so that both said rods will move exactly the same distance when the steering apparatus is operated.

In testimony whereof I affix my signature, in presence of two witnesses.

JOHN P. STEIN.

Witnesses:
ED. A. KELLY,
M. C. KREIDER.